(12) United States Patent
Star et al.

(10) Patent No.: US 8,895,095 B2
(45) Date of Patent: Nov. 25, 2014

(54) BEVERAGE BREWING APPARATUS WITH A FILTER CARRIER RECEIVER

(75) Inventors: William D. Star, Richmond, VA (US); Mark K. Romandy, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 517 days.

(21) Appl. No.: 12/721,806

(22) Filed: Mar. 11, 2010

(65) Prior Publication Data

US 2011/0223302 A1 Sep. 15, 2011

(51) Int. Cl.
| | |
|---|---|
| A23L 1/28 | (2006.01) |
| A47J 31/00 | (2006.01) |
| A47J 31/20 | (2006.01) |
| A23L 2/39 | (2006.01) |
| A47J 31/44 | (2006.01) |
| A47J 31/36 | (2006.01) |

(52) U.S. Cl.
CPC .............. *A47J 31/4467* (2013.01); *A23L 2/39* (2013.01); *A47J 31/3666* (2013.01)
USPC ................................ 426/425; 99/279; 99/318

(58) Field of Classification Search
USPC ..................... 426/425; 99/279, 318
See application file for complete search history.

(56) References Cited

U.S. PATENT DOCUMENTS

| | | | |
|---|---|---|---|
| 4,315,577 A | 2/1982 | Bernson, Jr. | |
| 4,644,856 A | 2/1987 | Borgmann | |
| D342,860 S | 1/1994 | Azpiri | |
| 5,463,933 A | 11/1995 | Landais | |
| D366,982 S | 2/1996 | Amiel | |
| 5,638,741 A | 6/1997 | Cisaria | |
| 5,642,656 A | 7/1997 | Braendle | |
| D390,742 S | 2/1998 | Sander | |
| 6,009,792 A | 1/2000 | Kraan | |
| D429,594 S | 8/2000 | Lin | |
| D431,749 S | 10/2000 | Cahen | |
| D431,750 S | 10/2000 | Cahen | |
| 6,192,786 B1 | 2/2001 | Gasser et al. | |
| D449,198 S | 10/2001 | Cahen | |
| D449,199 S | 10/2001 | Cahen | |
| D449,488 S | 10/2001 | Cahen | |
| D477,963 S | 8/2003 | Cahen | |
| 6,698,332 B2 | 3/2004 | Kollep et al. | |
| D502,053 S | 2/2005 | Bodum | |
| 6,935,222 B2 | 8/2005 | Chen et al. | |
| D522,793 S | 6/2006 | Weaden | |
| 7,237,475 B2 | 7/2007 | Chen et al. | |
| 7,270,050 B2 | 9/2007 | Glucksman et al. | |
| D561,523 S | 2/2008 | Trazzi | |
| 7,347,138 B2 | 3/2008 | Bragg et al. | |
| 2005/0160919 A1* | 7/2005 | Balkau | ............................ 99/279 |
| 2005/0172821 A1 | 8/2005 | Chen et al. | |
| 2006/0137534 A1 | 6/2006 | Chin Chen et al. | |
| 2007/0017374 A1 | 1/2007 | Chen et al. | |
| 2007/0017375 A1 | 1/2007 | Chen et al. | |
| 2007/0039478 A1 | 2/2007 | Ng | |
| 2007/0151458 A1 | 7/2007 | Chen et al. | |
| 2008/0236403 A1 | 10/2008 | Cortese | |

OTHER PUBLICATIONS

The Free Dictionary. Definition Incline. http://www.thefreedictionary.com/incline. retreived on Jan. 28, 2013.*

* cited by examiner

*Primary Examiner* — Leslie Wong
(74) *Attorney, Agent, or Firm* — Alexander D. Raring

(57) ABSTRACT

A beverage maker is disclosed with a removable filter carrier, a receiver for the removable filter carrier, and a locking mechanism to selectively secure and seal the carrier to the beverage maker by way of lifting the carrier to engage a sealing surface. In use, the filter carrier is linearly inserted into the receiver via a front face of the beverage maker. The receiver may also include the locking mechanism. The locking mechanism includes a lever that is actuated to operate the locking mechanism. Actuation of the lever is translated to lift and clamp the filter carrier against the seal surface. In the 'sealed' position, the lever is selectively fixed in place until the user actuates the lever so as to release the filter carrier. In the 'released' position, the filter carrier is still supported by the locking mechanism but it may be selectively removed from the receiver. The locking mechanism reduces or eliminates conventional issues with securing a filter carrier to a beverage maker such as properly aligning the filter carrier so that it may be secured to the beverage maker, the filter carrier disengaging from the beverage maker during use, or not being able to remove the filter carrier after a brew cycle.

7 Claims, 7 Drawing Sheets

BEVERAGE BREWING APPARATUS WITH A FILTER CARRIER RECEIVER

FIELD OF THE DISCLOSURE

The present apparatus relates to a beverage brewer comprising a removable filter carrier and a filter carrier receiver that facilitates insertion and removal of the filter carrier. The filter carrier is linearly inserted into the face of the receiver. In one embodiment, the receiver further comprises a lever-actuated locking mechanism to secure and seal the filter carrier to a seal surface of the beverage maker. The locking mechanism translates the actuation of the lever to vertically lift the filter carrier.

BACKGROUND

Certain beverage brewers, such as espresso makers, include removable filter holders/carriers that are selectively locked in place on the beverage brewer. The filter carriers include a handle and a reservoir containing a filter and an infusible material. Conventional filter holders are connected to the beverage brewer by way of rotating the filter holder to engage a bayonet coupling as illustrated, for example, by U.S. Pat. Nos. 4,644,856 and 5,463,933.

As further described in these references, a conventional filter carrier includes a carrier reservoir filled with an infusible material, and a user positions the filter carrier under a beverage maker's brew head. The reservoir includes inclined planes on the outer surface of the reservoir. For the conventional bayonet coupling filter carrier, if the carrier is in the correct alignment, the carrier can be upwardly inserted into the brew head. To secure the conventional filter carrier, the carrier must be rotated by means of the handle. Rotating the carrier causes the inclined planes on the outer surface of the carrier to engage the upper surface of corresponding inclined planes in the brew head. The rotational movement forces the carrier up the brew head's inclined planes to bring the filter carrier from a free position to a locked position. In the free position, the corresponding inclined planes are not engaged so that the beverage maker or brew head does not support the carrier at all.

There are recognized problems with this conventional construction. First, the user is unable to determine whether the filter carrier is in the proper alignment to insert the carrier into the brew head because the brew head's inclined planes are on an internal diameter or surface that is not visible to the user. The carrier must be in the correct position so that the brew head's inclined planes do not block the insertion of the carrier.

Since this alignment cannot be confirmed prior to inserting the filter carrier, the user must often make several attempts to properly align the carrier so that it may be inserted into the brew head. Basically, the insertion of the carrier requires trial and error. This mechanism can be frustrating for a user and may lead to spilling the contents of the carrier reservoir or otherwise not properly securing the filter carrier.

In addition, it is often unclear to the user how far the carrier should be rotated to ensure a proper seal while avoiding damage to the brew head or carrier caused by too much force. If the user fails to properly and fully lock the carrier, the seal between the carrier and the brew head may leak when liquid, pressurized gas, or pressurized fluid is introduced to the carrier from the beverage maker. The carrier may also entirely disengage from the beverage maker during use. On the other hand, applying too much rotational force can permanently damage the carrier, the brew head, or the seal between the two.

It has also been noted, as in U.S. Pat. No. 5,642,656, that pressurized beverage makers can make the removal of conventional bayonet-coupling carriers difficult. The force between the conventional bayonet connecting elements caused by the relatively high pressure produced by the beverage maker is so great that the filter carrier practically cannot be released after a brew cycle. This can be a further source of frustration for the user of a conventional filter carrier. Bayonet locking mechanisms interfere with the user's ability to clean the seal area.

The '856, '656, and '933 patents present improvements to pressurized beverage makers and the corresponding filter carriers that address these recognized problems. However, these improvements maintain and continue the use of bayonet-style locking filter carriers. In light of the above and other shortcomings with current mechanisms for securing filter carriers, there is a need for a new filter carrier receiver and/or locking mechanism that eliminates bayonet-style locking where the receiver and/or locking mechanism is operable with a selectively removable filter carrier for a beverage maker.

Ideally, an improved receiver and/or locking mechanism would simplify the insertion and retention of a filter carrier to a beverage maker relative to known means. It might also preclude or reduce the possibility of the carrier disengaging from the beverage maker during operation. Moreover, a new receiver and/or locking mechanism could improve the removal of the filter carrier after a brew cycle. A filter carrier receiver and locking mechanism in accordance with the following disclosure is thought to solve one or more of these or other needs.

SUMMARY OF THE DISCLOSURE

A brewed beverage maker with a removable filter carrier is provided. The beverage maker includes a receiver to support the compatible filter carrier under a fluid flow produced by the beverage maker. The receiver may further comprise a lever-actuated locking mechanism to secure and seal the filter carrier to the beverage maker. Broadly, the receiver is integral to a beverage maker, and the filter carrier is linearly inserted into the front face of the receiver.

The subject filter carrier for holding and supporting an infusible material comprises a handle and a reservoir connected to the handle. The infusible material can include loose, packaged, or packed infusible material. The carrier's reservoir comprises a floor, a cylindrical sidewall, and a circular access opening to the reservoir opposite of the floor. The cylindrical sidewall defines a vertical axis through the reservoir. The handle extends from the sidewall and may be perpendicularly aligned with the vertical axis through the reservoir. In use, infusible material is added to the reservoir via the access opening. An optional filter may underlie the infusible material.

In one embodiment, a pair of planar projections extends outwardly from the reservoir sidewall. The planar projections may be aligned perpendicular to the vertical axis through the reservoir. In other words, the projections may be in a horizontal plane with the cylindrical sidewall defining a vertical, central reservoir axis. In one embodiment, the projections extend outwardly from opposing sides of the cylindrical sidewall with each projection placed 90 degrees from the handle.

The filter carrier projections are compatible with a receiver secured to or integral with the beverage maker. The receiver comprises a housing and shelves that receive and support the carrier's planar projections. The filter carrier is linearly inserted into the front face of the receiver by sliding the projections onto the receiver's shelves. The filter carrier is not rotated in order to place the filter carrier on/in the beverage maker.

In yet another embodiment, the receiver includes a locking mechanism that is actuated to vertically lift and clamp the filter carrier access opening against a seal surface. The locking mechanism includes an unsealed/open/free position and a sealed/closed/secure position. The receiver supports the carrier in either position.

Once actuated to the closed position, the subject locking mechanism continues to clamp and seal the carrier to a seal surface until the user selectively disengages the locking mechanism. With the locking mechanism disengaged, the carrier withdraws from the seal surface under gravitational force. In one embodiment, a resilient body or material, such as a spring, expandable foam, or other resilient material, is included to facilitate the separation of the filter carrier from the seal surface. The user does not apply any force to separate the filter carrier from the seal surface. Once in the free position, the filter carrier can be removed from the beverage maker without rotating the filter carrier. The user withdraws the filter carrier along the same linear axis as was employed to insert the carrier into the front face of the receiver.

As noted above, no rotation of the filter carrier occurs during insertion or removal of the filter carrier from the receiver or beverage maker. The filter carrier is not rotated to lock or seal the carrier to a seal surface. The act of inserting or removing the filter carrier from the locking mechanism does not create or break the seal between the filter carrier and a sealing surface. Instead, the locking mechanism, which is distinct from the filter carrier, is actuated between an open position and a closed position.

In still further detail, the locking mechanism comprises an outer housing secured to the beverage brewing device and supporting interior cam components. The locking mechanism further comprises a lever and an inverted u-shaped drive cam connected to the lever. In use, the user rotates the lever from a first, open position to a second, closed position. Rotation of the lever causes the corresponding rotation of the u-shaped drive cam from a corresponding first, open position to a second, closed position. The rotation of the drive cam is translated into the linear, forward movement of a slide cam that comprises a pair of inclined surfaces. Each inclined surface of the slide cam engages a lift cam that can be vertically displaced. The lift cams comprise the receiver shelves supporting the filter carrier. Basically, the slide cam mechanically links the lever and drive cam to the lift cam(s).

The forward motion of the slide cam forces the lift cams upwards as the drive cam moves to the second, closed position. The lift cams support the filter carrier and, therefore, force the filter carrier upwards against a surface to seal the filter carrier reservoir. The drive cam, slide cam, and lift cam(s) remain in the closed position until the lever is actuated away from the closed position. When released, the locking mechanism and locking mechanism lever return to the open position. Therefore, if the lever is placed in any position other than the closed position, the lever automatically moves to the open position.

The subject beverage maker may be a drip coffee maker, a pressurized beverage maker, such as an espresso maker, and the like. The beverage maker produces a flow of liquid and/or steam to the carrier reservoir. In one embodiment, the flow of liquid and/or steam occurs in a direction along the central axis of the reservoir or, in other words, perpendicular to the plane of the carrier projections.

As will be understood better in view of the subject figures and detailed description, the apparatus and method as disclosed herein facilitates the insertion of a filter carrier into a beverage brewer relative to conventional filter carriers. Once inserted, the carrier is supported at all times so as to prevent accidental separation of the filter carrier from the beverage maker, including during a brew cycle.

In addition, because the filter carrier is inserted into the front face of a receiver, the user may easily ascertain the proper alignment of the filter carrier with the receiver. Moreover, the new locking mechanism disclosed here remains in the locked or closed position until a user actuates the locking mechanism away from the closed position.

The subject apparatus and method also facilitates the removal of the filter carrier from a beverage maker following a brew cycle relative to conventional bayonet-style locking filter carriers. Whereas conventional filter carriers can be difficult to disengage following a brew cycle, particularly where pressurized fluid is employed, the subject locking mechanism releases the filter carrier from the seal prior to the user attempting to remove the filter carrier from the beverage maker. The user actuates the lever back to the first, open position. The drive cam moves to the first, open position thereby releasing the slide cam. The lift cams push the slide cam back thereby allowing the lift cams to lower away from the sealing surface. In one embodiment, a resilient member or material may apply a downward force on the lift cams. The lift cams engage the filter carrier during the downward motion of the lift cam(s) to ensure the carrier separates from the sealing surface. The filter carrier can then be removed by linearly removing the filter carrier from the locking mechanism. The user does not apply force to unlock or unseal the filter carrier from the beverage maker.

In short, a filter carrier and locking mechanism in accordance with the subject disclosure efficiently addresses at least one of the above or other shortcomings of conventional filter carriers and locking mechanisms. The construction and method disclosed herein facilitates the insertion and removal of the filter carrier to a beverage maker. Moreover, the construction prevents the complete separation of the filter carrier from the beverage maker during a brew cycle even if the carrier is in an unsealed or free position.

Further features and advantages of the subject apparatus and method will become apparent to those of skill in the art from the following detailed description of preferred embodiments taken in conjunction with the accompanying drawings.

DETAILED DESCRIPTION OF THE PREFERRED EMBODIMENTS

As will be described in detail herein, the subject apparatus and method can improve the insertion of a filter carrier into, sealing of a filter carrier to, and removal of a filter carrier from a beverage brewer. There are possible and foreseen variations of the subject filter carrier, receiver, and a locking mechanism as disclosed herein. Accordingly, the specific structure disclosed and illustrated is not a reasonable limitation of the scope of the present disclosure and claims. The following describes certain preferred embodiments of the filter carrier, receiver, locking mechanism, and a beverage maker with the same.

Figure 1:
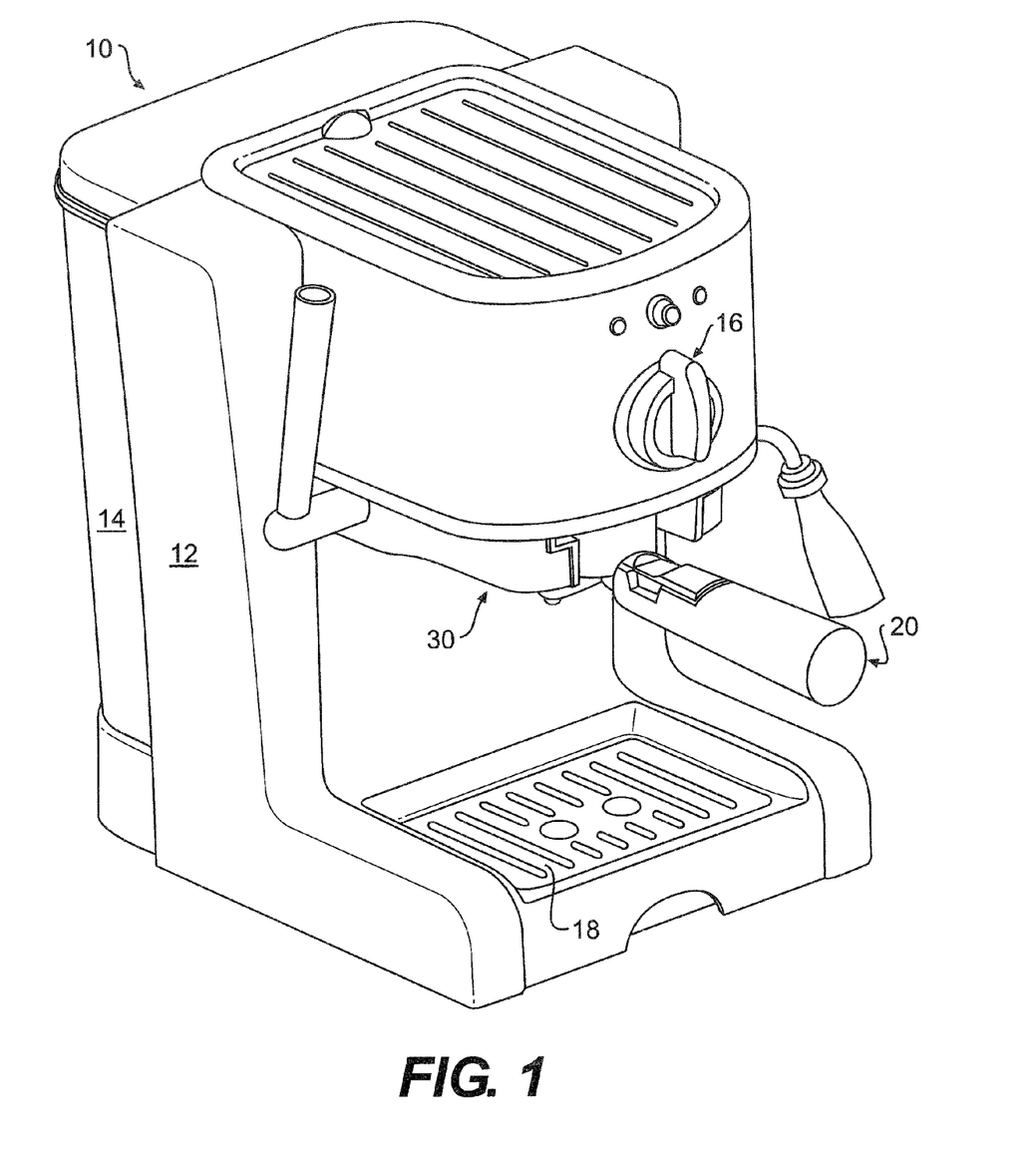
FIG. 1 is a perspective view of a beverage maker including a removable filter carrier and selectively actuated locking mechanism in accordance with the present disclosure.
Figure 2:
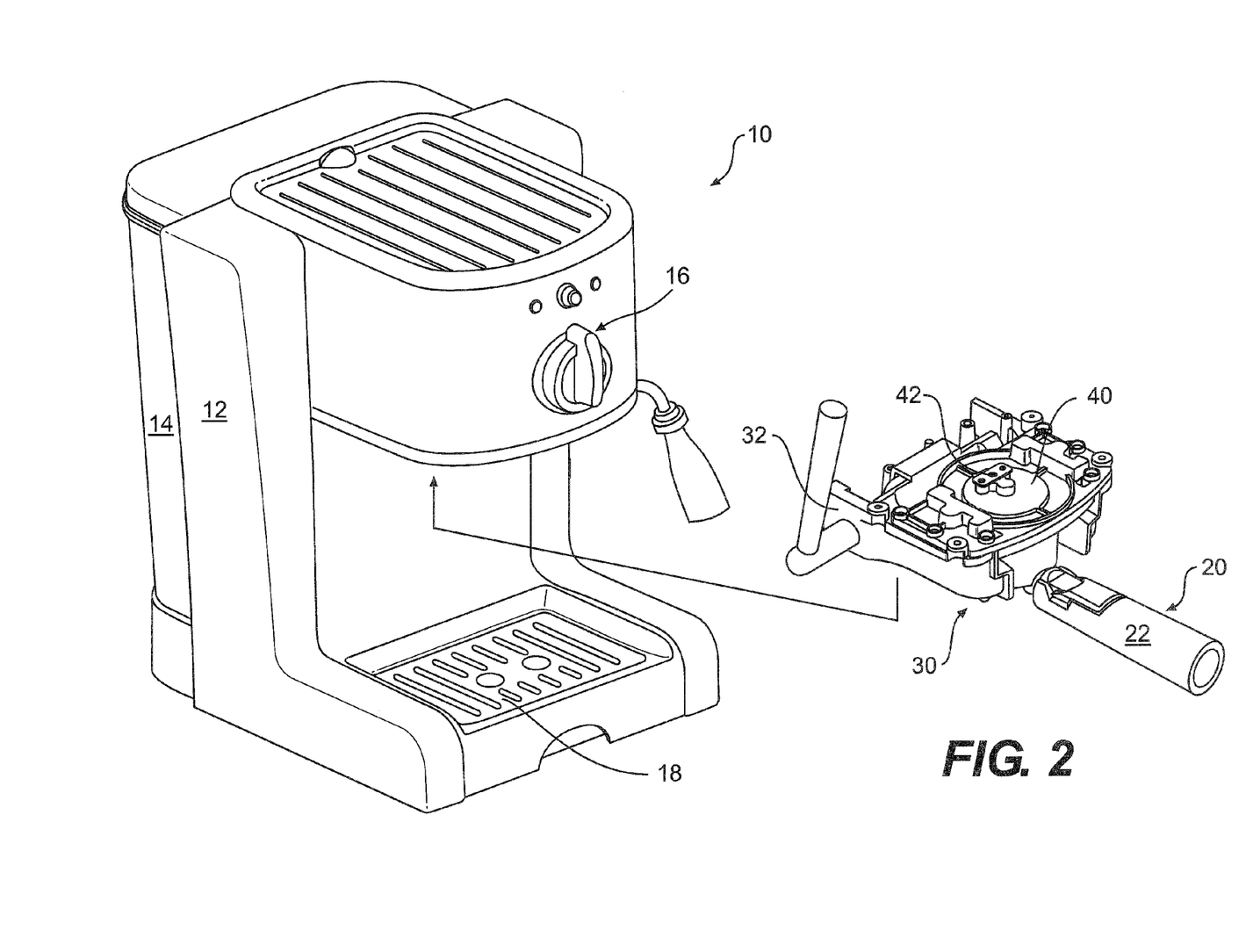
FIG. 2 is a perspective, exploded view of filter carrier with locking mechanism in relation to a beverage brewer in accordance with the present disclosure.

Turning first to FIGS. 1 and 2, there is illustrated a beverage maker 10 comprising a stand 12, fresh water reservoir 14, and a selectively removable filter carrier 20. The beverage maker has a front face including controls 16 as well as two sides, a top, a bottom, and a back face. Generally, the beverage maker will be placed on a countertop with the front face facing a user.

The illustrated beverage maker is an espresso-type coffee maker wherein water in fresh water reservoir 14 is pumped under pressure to an infusible material in filter carrier 20. It should be understood that the subject beverage maker 10 might be a drip coffee maker, a pressurized beverage maker, and the like. Regardless of the type of beverage prepared by the apparatus, beverage maker 10 produces a flow of liquid and/or steam that is introduced to the infusible material in selectively removable filter carrier 20.

Beverage maker 10 includes a receiver 30 to support the compatible filter carrier 20 in-line with the fluid flow produced by beverage maker 10. Receiver 30 is secured to or integral with beverage maker 10. As will be further described below, filter carrier 20 is linearly inserted into the front face of beverage maker 10 via receiver 30. Receiver 30 may further comprise a lever-actuated locking mechanism to secure the filter carrier to the beverage maker.

Figure 3:
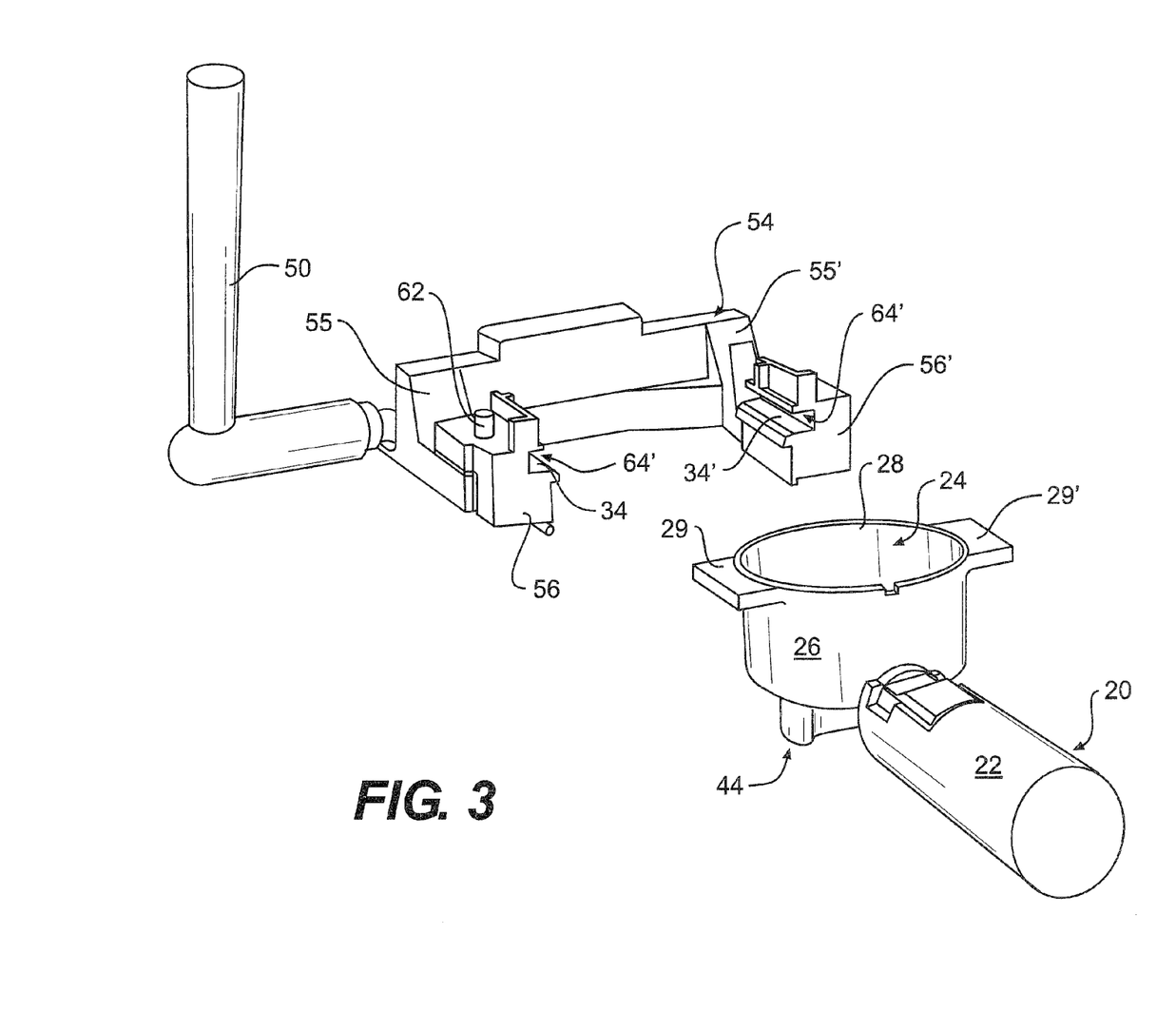
FIG. 3 is a perspective, exploded view of a filter carrier relative to a locking mechanism, as described herein.

With reference to FIGS. 2 and 3, filter carrier 20 for holding and supporting an infusible material comprises a handle 22 and a reservoir 24 connected to handle 22. The infusible material (not illustrated) can include loose, packaged, or packed infusible material. The carrier's reservoir 24 comprises a floor 25 (see FIG. 5), a cylindrical sidewall 26, and a circular access opening 28 to the reservoir opposite of the floor. Cylindrical sidewall 26 inherently defines a vertical, central axis through reservoir 24. Handle 22 extends from sidewall 26 and, in the illustrated embodiment, may be perpendicularly aligned with the vertical axis defined by reservoir 24. In use, the infusible material is added to reservoir 24 via access opening 28. As one of skill in the art would appreciate, an optional filter may underlie the infusible material.

In one embodiment, a pair of planar projections 29, 29' extends outwardly from reservoir sidewall 26. Planar projections 29, 29' may be aligned perpendicular to the vertical axis through the reservoir. In other words, projections 29, 29' may be in a horizontal plane. Projections 29, 29' may extend outwardly from opposing sides of the cylindrical sidewall with each projection placed 90 degrees on the sidewall from attachment point for handle 22.

Figure 4:
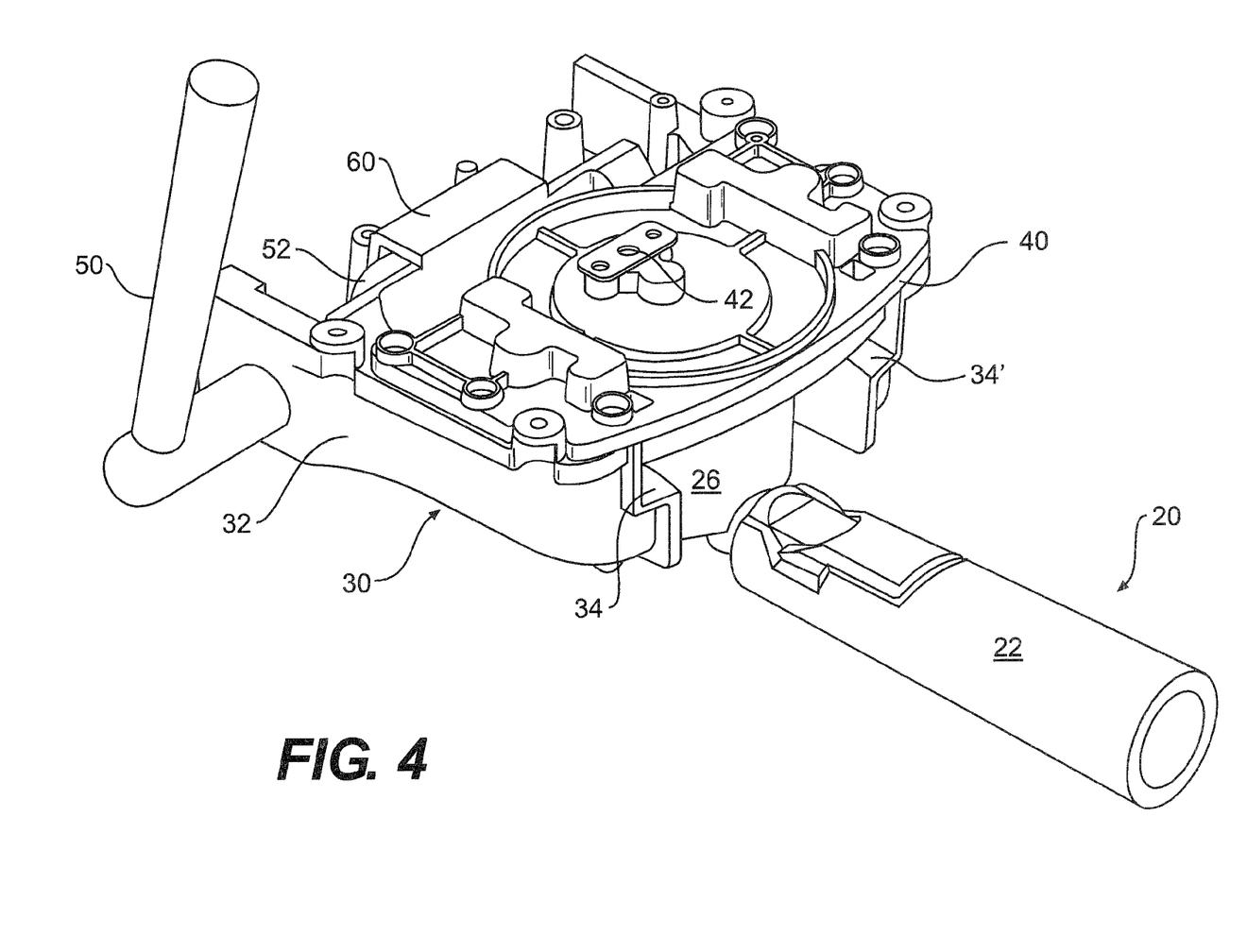
FIG. 4 is perspective view of a filter carrier inserted into a locking mechanism as described herein.
Figure 5:
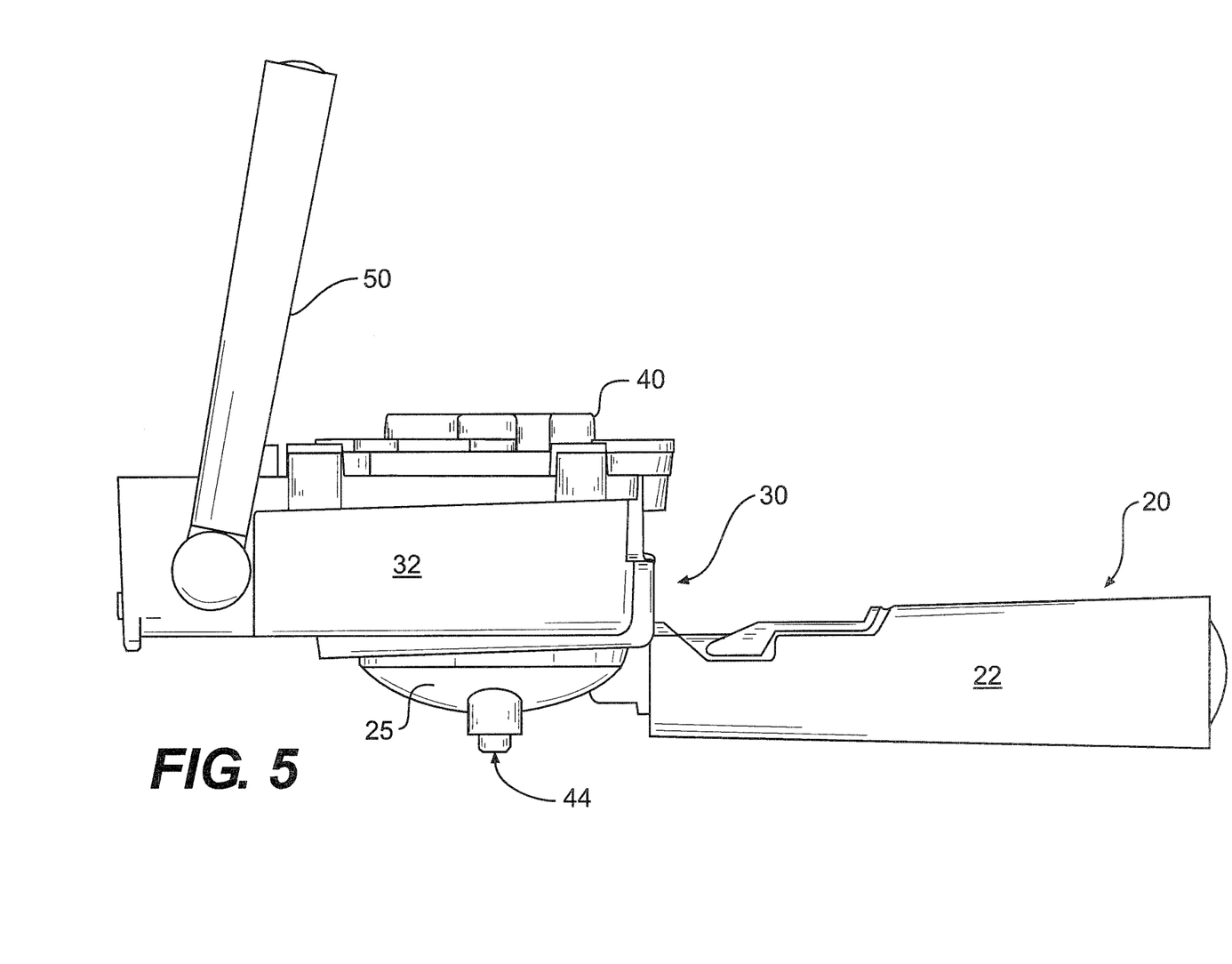
FIG. 5 is a side view thereof.

The filter carrier projections are compatible with the receiver 30 secured to or integral with the beverage maker. As FIGS. 2, 4, and 5 illustrate, receiver 30 comprises a housing 32 and shelves 34, 34' that correspond to, and slidably receive and support, carrier's planar projections 29, 29'. As such, receiver 30 is constructed so as to receive filter carrier 20 by linearly inserting carrier 20 into the front face of receiver 30. Projections 29, 29' effectively slide onto receiver's shelves 34, 34'. Filter carrier 20 is not rotated in order to place filter carrier 20 on or in beverage maker 10.

As best illustrated by the exploded view of FIG. 2, receiver 30 abuts to a showerhead 40 through which fluid passes into reservoir 24. Showerhead 40 comprises a plate or member that funnels or otherwise directs fluid into carrier reservoir 24.

Receiver housing 32 may be secured directly to showerhead 40 via fasteners and then also to beverage maker 10 via other fasteners so that showerhead 40 has no direct connection to the beverage maker. Instead, showerhead 40 is effectively sandwiched between beverage maker 10 and receiver 30. Of course, showerhead 40 may be integral with the beverage maker with the receiver 30 mounting to the showerhead and/or the beverage maker via fasteners. One of skill in the art will appreciate these and other configurations for mounting showerhead 40 and receiver 30 to beverage maker 10.

Showerhead 40 comprises in inlet 42 defining an aperture through showerhead 40 that allows the fluid flow produced by beverage maker 10 to pass into reservoir 24. Filter carrier 20, in turn, has at least one outlet 44 in floor 25 (see FIG. 5) where a brewed beverage, having passed through an infusible material, is delivered to a brewed beverage receptacle placed on a drip tray 18 of beverage maker 10.

As can be appreciated, the fluid flow through inlet 42 may be along the vertical, central axis of reservoir 24 and, therefore, perpendicular to projections 29, 29', shelves 34, 34', and handle 22. Shelves 34, 34' underlie the projections 29, 29' so as to support carrier 20 against the force of the fluid flow whether the fluid flow is under high pressure or otherwise. As such, once carrier 20 is inserted into receiver 30, receiver 30 supports carrier 20 at all times. Carrier 20 can only be disengaged or removed from receiver 30 by retracting carrier 20 along the same line employed to insert the filter carrier. In other words, carrier 20 cannot accidentally disengage from receiver 30 during a brew cycle initiated by beverage maker 10.

In certain embodiments, beverage maker 10 will produce a pressurized fluid flow. In these instances, it is necessary to seal access opening 28 of filter carrier 20 to a sealing surface, such as a lower surface of showerhead 40, an o-ring, or the like, as the pressurized fluid would escape reservoir 24 instead of passing through the infusible material and/or outlet 44. For these embodiments, receiver 30 may further comprise a locking mechanism that is actuated to vertically lift and clamp the filter carrier access opening 28 against the seal surface. Broadly, the locking mechanism would include an unsealed/open/free position and a sealed/closed/secure position. Receiver 30 supports filter carrier 20 in either the free or secure positions.

Once actuated to the closed position, the subject locking mechanism continues to clamp and seal the carrier to a seal surface until the user selectively disengages the locking mechanism. With the locking mechanism disengaged, carrier 20 withdraws from the seal surface under gravitational force.

In one embodiment, as further described below, a resilient body or material (not illustrated), such as a spring, expandable foam, or other resilient material, is included to facilitate the separation of filter carrier 20 from the seal surface. The user does not apply any force to separate the filter carrier from the seal surface. Once in the free position, filter carrier 20 can be removed from the beverage maker without rotating the filter carrier. The user withdraws filter carrier 20 along the same linear axis as was employed to insert carrier 20 into the front face of receiver 30.

As noted above, no rotation of the filter carrier occurs during insertion or removal of the filter carrier from the receiver or beverage maker. The filter carrier is not rotated to lock or seal the carrier to a seal surface. The act of inserting or removing the filter carrier from the locking mechanism does not create or break the seal between the filter carrier and a sealing surface. Instead, the locking mechanism, which is distinct from the filter carrier, is actuated between an open position and a closed position.

In still further detail, with reference to FIGS. 3-7, the locking mechanism comprises the receiver outer housing 32 secured to beverage brewing device 10. The housing at least partially encloses and supports interior cam components. The locking mechanism further comprises a lever 50 and an inverted u-shaped drive cam 52 connected to lever 50. Drive cam 52 is rotatably fixed in place via bearings or other structure so as to rotate along with the actuation of lever 50.

In use, a user actuates lever 50 from a first, open position to a second, closed position. Rotation of lever 50 causes the corresponding rotation of the u-shaped drive cam 52 from a corresponding first position, corresponding to the open position of the locking mechanism, to a second position, corresponding to the closed position of the locking mechanism. The rotation of drive cam 52 is translated into the linear, forward movement of a slide cam 54 that comprises a pair of inclined surfaces 55, 55'. One or both of the inclined surfaces 55, 55' of slide cam 54 engages a lift cam 56, 56' that can be vertically displaced. In this embodiment, lift cams comprise 56, 56' the receiver shelves 34, 34' supporting filter carrier 20. Basically, slide cam 54 mechanically links lever 50 and drive cam 52 to the lift cam(s) 56, 56'.

The forward motion of slide cam 54 forces the lift cams 56, 56' upwards as drive cam 52 moves to the second, closed position. The lift cams support filter carrier 20 and, therefore, force filter carrier 20 upwards against a surface to seal the filter carrier reservoir.

Figure 6:
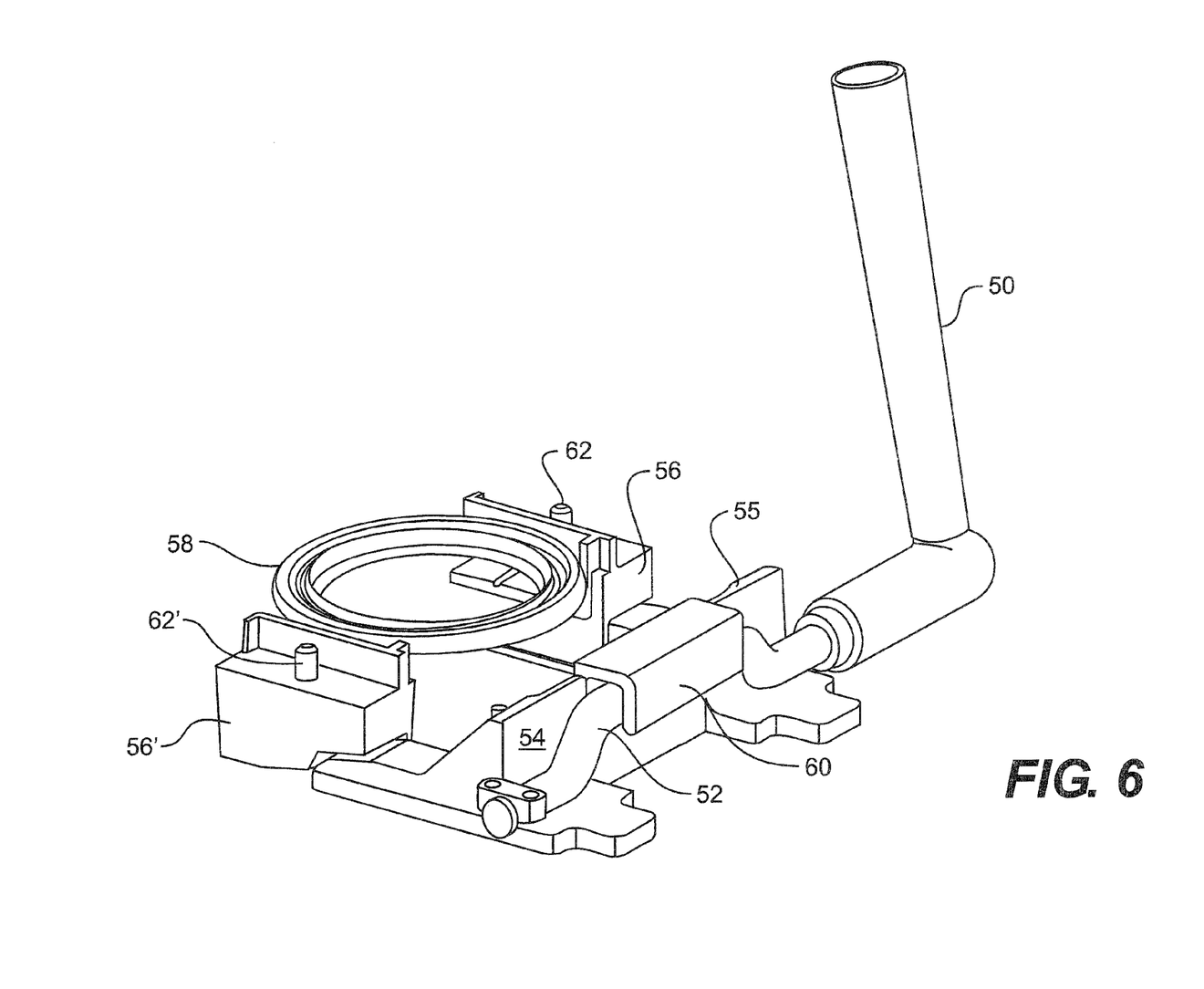
FIG. 6 is a rear perspective view of a locking mechanism and seal surface in accordance with one embodiment of the subject disclosure.
Figure 7:
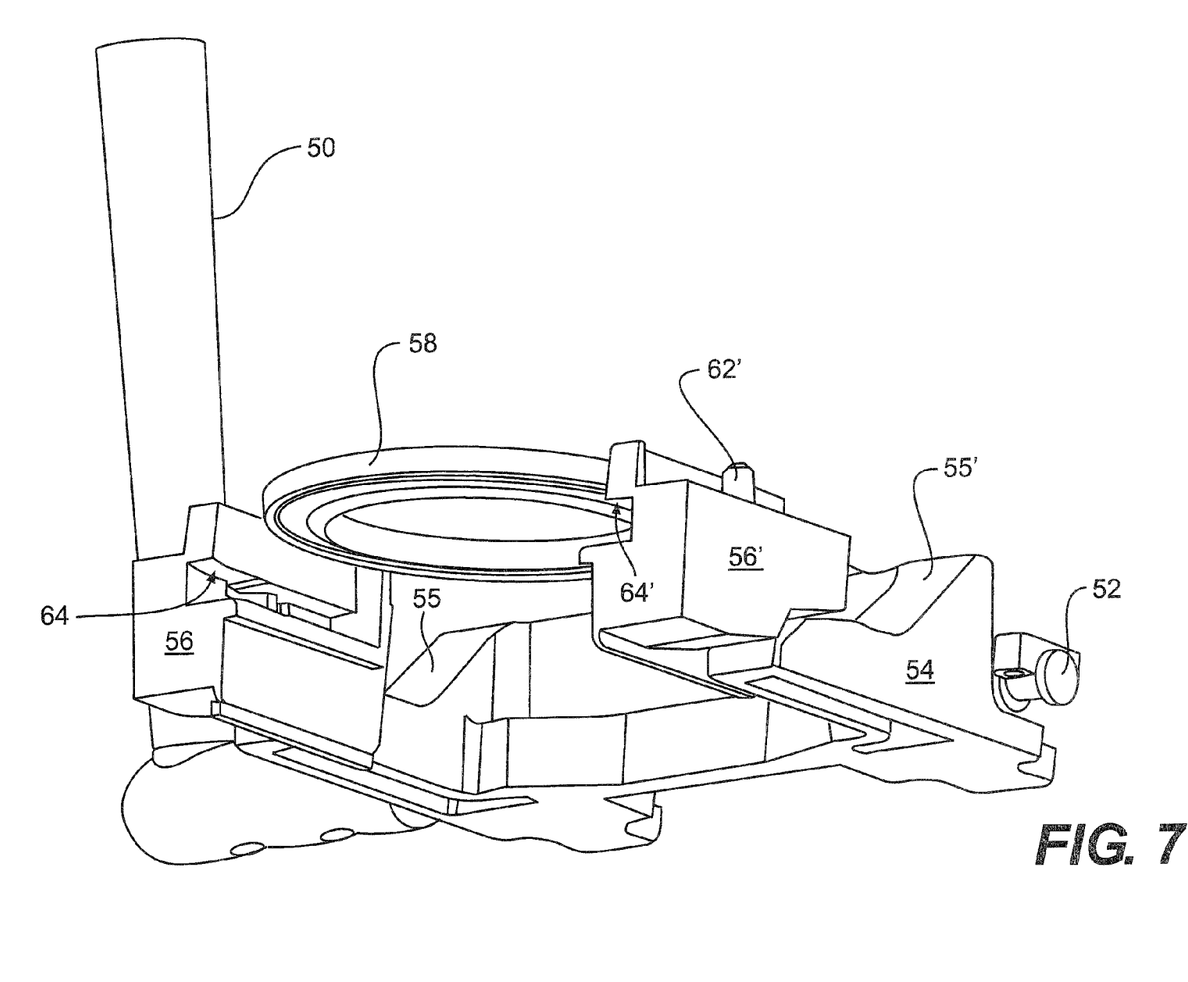
FIG. 7 is a front perspective view thereof.

The sealing surface is any surface or member to which access opening 28 fits to prevent the escape of gas or liquid from reservoir 24. In one embodiment, a resilient or flexible o-ring 58 acts as the seal surface against which the access opening seals.

In the closed position, the u-shape drive cam is horizontally aligned so as to be perpendicular to a back surface of the slide cam 54. The opposing force from placing carrier 20 under pressure to seal the access opening does not move the drive cam out of the horizontal position. As such, drive cam 52, slide cam 54, and lift cam(s) 56, 56' remain in the second or closed position until lever 50 is actuated away from the closed position. Once drive cam 52 is at least partially rotated back to a vertical alignment, slide cam 54 moves backward and returns drive cam to the first open position. Therefore, once released, the locking mechanism and locking mechanism lever 50 return to the open position. If lever 50 is placed in any position other than the closed position, lever 50 automatically moves to the open position.

Slide cam 54 includes a catch 60 that is engaged by drive cam 52 when drive cam 52 moves from the closed position to the open position. The catch effectively translates the actuation of the lever from the closed position to the open position to ensure that slide cam 54 retracts from the closed position.

Once retracted, lift cams 56, 56' will vertically descend away from the sealing surface, such as o-ring 58, thereby lowering filter carrier 20. A compressible or resilient member or material, such as a spring can be located atop each lift cam 56, 56' to bias the lift cams 56, 56' downward and away from the sealing surface. For instance, a coiled spring (not illustrated) can be placed atop lift cams 56, 56' on a post 62, 62'. The force applied to actuate the lever overcomes the bias force of the member, such as a spring, to allow the locking mechanism to enter the closed position. Once the lever is at least partially released so as to retract slide cam 54, the resilient member would force lift cams 56, 56' down the inclined cam surface 55, 55'. Upper lift cam ledges 64, 64' could be provided to engage the top surface of the carrier projections 29, 29' thereby withdrawing the filter carrier from the sealing surface. The user does not apply any force to break the seal between the carrier and the brewed beverage maker.

A filter carrier, receiver, and locking mechanism in accordance with the subject disclosure efficiently addresses at least one of the above or other shortcomings of conventional filter carriers and locking mechanisms. The construction and method disclosed herein facilitates the insertion and removal of the filter carrier to a beverage maker. Moreover, the construction prevents the complete separation of the filter carrier from the beverage maker during a brew cycle even if the carrier is in an unsealed or free position.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A mechanism to secure a selectively removable filter carrier to a brewed beverage maker, the mechanism comprising:
   a housing, the housing secured to the brewed beverage maker and supporting cam components;
   an actuatable, rotatable lever having an axis of rotation;
   a rotatable drive cam directly connected to the lever such that a rotation of the lever translates to a corresponding rotation of the drive cam, the drive cam on the axis of rotation of the lever, the drive cam further comprising an open position and a closed position;
   a linearly moveable slide cam with at least one inclined surface; and
   at least one lift cam located within the housing and mechanically linked to the drive cam via the slide cam, the rotation of the drive cam to the closed position positioning the drive cam in a horizontal alignment with at least a portion of the drive cam perpendicular to a back surface of the slide cam thereby causing a linear movement of the slide cam, the slide cam in contact with the lift cam such that the lift cam is displaced up or down on the vertical axis due to the actuation of the lever.

2. The mechanism of claim 1, wherein the filter carrier is supported by the at least one lift cam to raise and lower the filter carrier via the actuation of the lever.

3. The mechanism of claim 2, the filter carrier further comprising a handle, a reservoir connected to the handle, the reservoir comprising a cylindrical sidewall that defines a vertical central axis through the reservoir, and a pair of planar projections extending outwardly from the reservoir sidewall.

4. The mechanism of claim 3, wherein the brewed beverage maker provides a fluid flow and further comprises a fluid outlet, a fluid passing through the fluid outlet in a first direction, the at least one lift cam supporting the filter carrier via at least one of the planar projections, the planar projections aligned perpendicular to the fluid flow.

5. The mechanism of claim 1, the lever actuatable between a first position and a second position.

6. The mechanism of claim 5, wherein the lever automatically returns to the first position when the lever is not in the second position.

7. A method for operating a brewed beverage maker with a removable filter carrier, the method comprising:
   inserting the filter carrier into the front face of a brewed beverage maker via a receiver;
   actuating a lever about an axis of rotation from a first position to a second position;

rotating a drive cam on the axis of rotation via an actuation of the lever, the drive cam having a first position and a second position;

linearly driving a slide cam via a rotation of the drive cam, the rotation of the drive cam to the closed position positioning at least a portion of the drive cam perpendicular to a back surface of the slide cam;

providing a lift cam inside a housing;

lifting the filter carrier along a vertical axis via the lift cam, the lift cam engaged by the slide cam where a linear movement of the slide cam affects a movement of the lift cam along the vertical axis, the step of lifting the filter carrier resulting from the actuation of the lever to the second position;

initiating a brew cycle;

releasing the lever from the second position back to the first position; and removing the filter carrier from the brewed beverage maker.

* * * * *